United States Patent
Tripathi et al.

(10) Patent No.: US 7,480,291 B2
(45) Date of Patent: Jan. 20, 2009

(54) METHOD AND SYSTEM FOR PROCESSING COMMUNICATIONS PACKETS ACCORDING TO EVENT LISTS

(75) Inventors: Sunay Tripathi, San Jose, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1082 days.

(21) Appl. No.: 10/683,897

(22) Filed: Oct. 10, 2003

(65) Prior Publication Data
US 2005/0122970 A1    Jun. 9, 2005

Related U.S. Application Data

(60) Provisional application No. 60/465,147, filed on Apr. 23, 2003.

(51) Int. Cl.
*H04L 12/56* (2006.01)
*H04J 1/16* (2006.01)

(52) U.S. Cl. .................. 370/389; 370/252; 709/238

(58) Field of Classification Search .......... 370/252, 370/389, 386, 237, 238; 709/207, 230, 238–242
See application file for complete search history.

(56) References Cited

U.S. PATENT DOCUMENTS

| 5,592,622 | A | * | 1/1997 | Isfeld et al. ............ 709/207 |
| 5,949,891 | A | * | 9/1999 | Wagner et al. ............ 381/98 |
| 2005/0138189 | A1 | * | 6/2005 | Tripathi et al. ............ 709/230 |

* cited by examiner

*Primary Examiner*—John Pezzlo
(74) *Attorney, Agent, or Firm*—Martine Penilla & Gencarella LLP

(57) ABSTRACT

In an embodiment of the present invention, a first communication packet is assigned to a first communication data structure that is unique to a first connection comprising the first communication packet. A first event list is selected from a database based on a classification of the first communication packet. The first event list identifies a first plurality of communication modules (e.g., socket layer, TCP layer, IP layer, IP security layer, firewall layer, etc.) and an ordering thereof, specific for the needs of the first connection. The first communication packet is processed through the first plurality of communication modules based upon the ordering specified in the first event list. A reference contained in the data structure marks the current packet position though the plurality of communication modules.

20 Claims, 9 Drawing Sheets

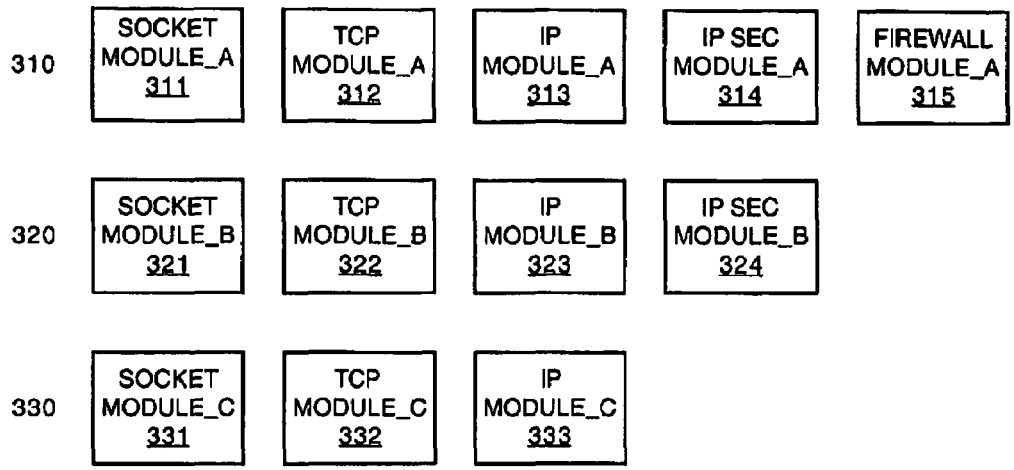
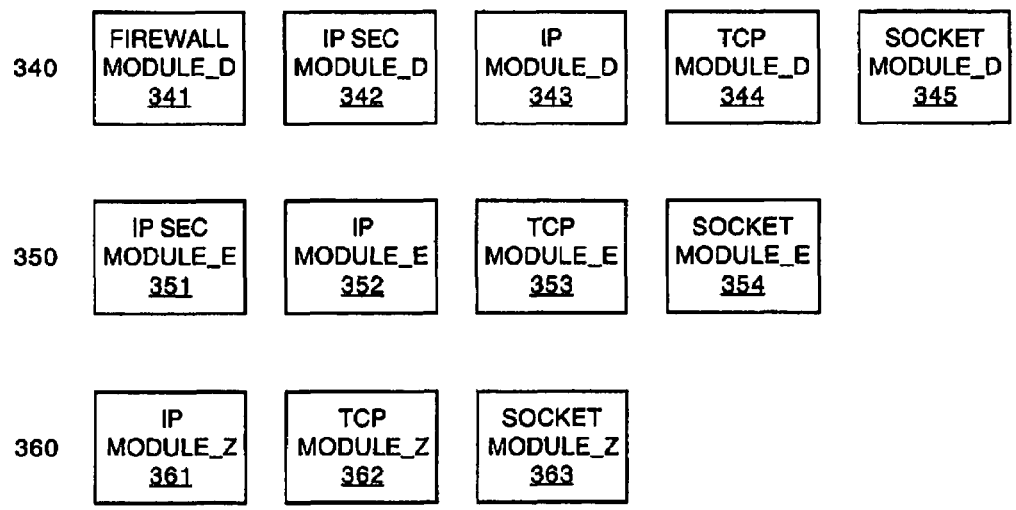
Fig. 3A

CONN_T a
213

| | POINTER |
|---|---|
| CONN_RECV (410) | 411 |
| CONN_RECV_CURRENT (420) | 421 |
| CONN_SEND (430) | 431 |
| CONN_SEND_CURRENT (440) | 441 |

CONNECTION 221

CONN_T b
214

| | POINTER |
|---|---|
| CONN_RECV (450) | 451 |
| CONN_RECV_CURRENT (460) | 461 |
| CONN_SEND (470) | 471 |
| CONN_SEND_CURRENT (480) | 481 |

CONNECTION 231

Fig. 4

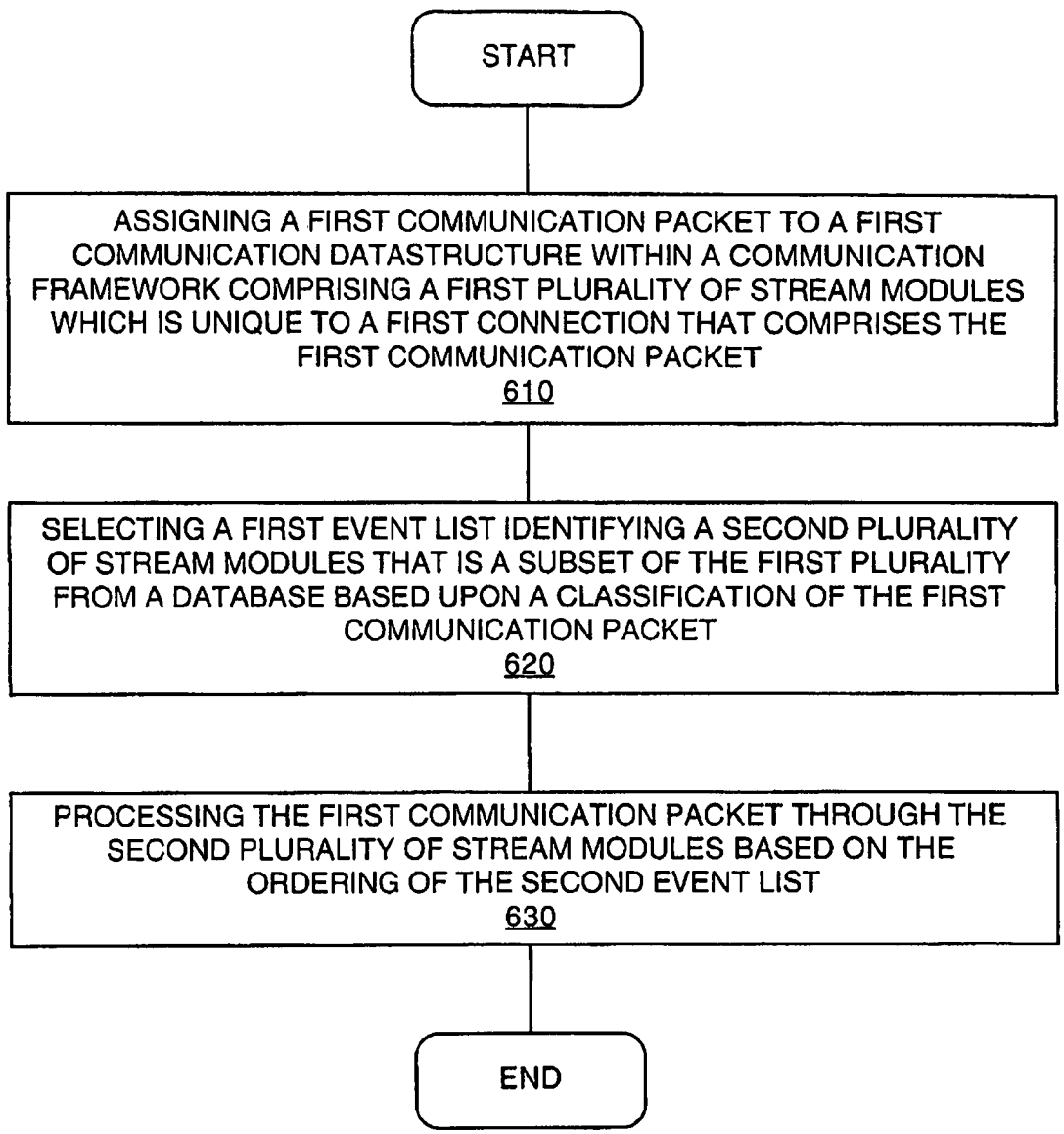

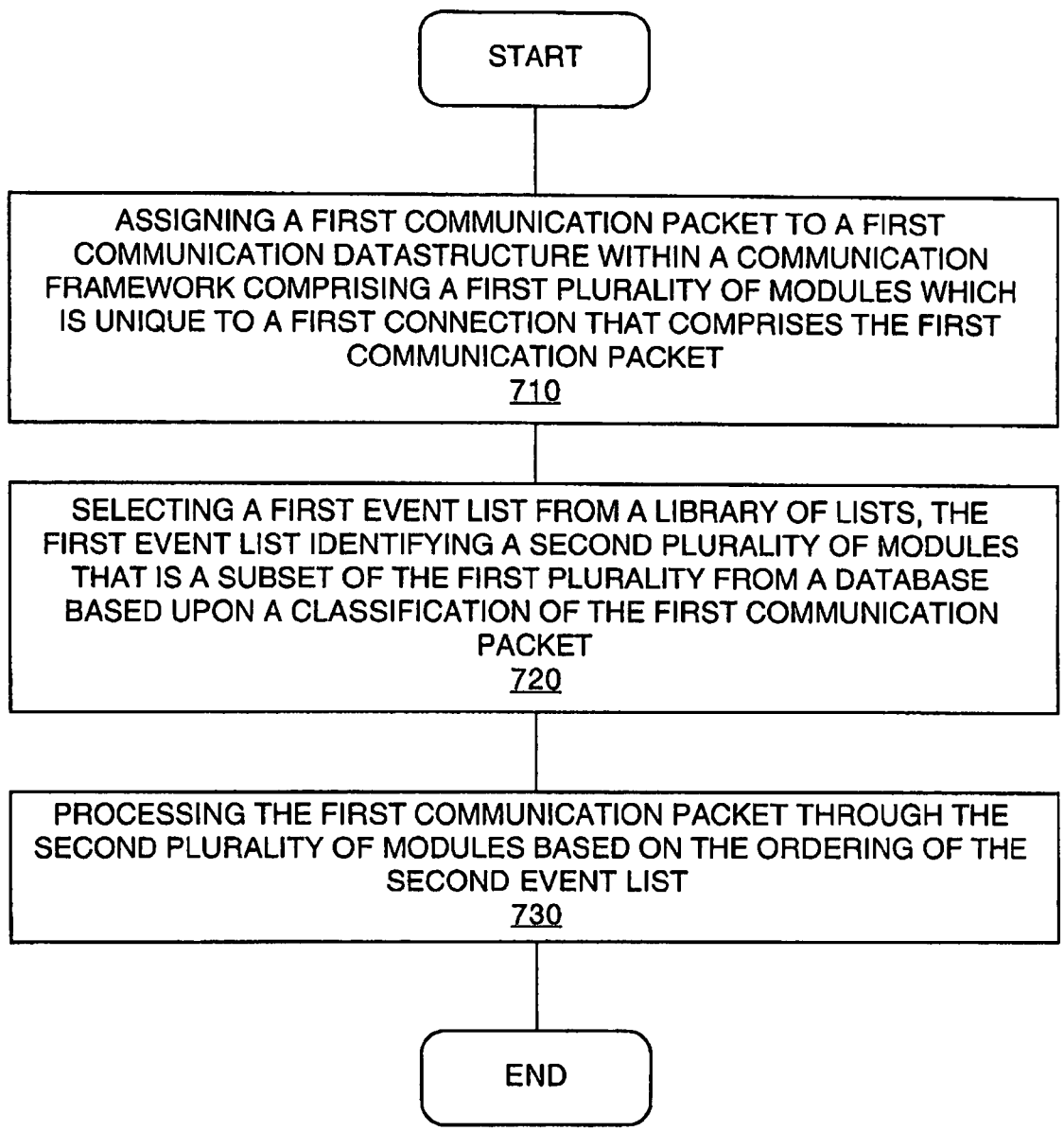

though the plurality of communication modules based upon the ordering specified in the event list. All other data packets for the new channel are similarly processed through the event list. The data structure also includes a reference, which indicates for a data packet, its current location in the modules of the event list as the data packet is being processed. By determining which modules are required for the connection only once (e.g., at the start of the new connection), each data packet processed within the set-up connection avoids the overhead checking associated with modules that are required for the connection.

METHOD AND SYSTEM FOR PROCESSING COMMUNICATIONS PACKETS ACCORDING TO EVENT LISTS

CROSS REFERENCE TO RELATED APPLICATIONS

The present patent application claims benefit to U.S. Provisional Patent Application Number 60/465,147 filed Apr. 23, 2003, entitled Vertical Perimeter Protection Mechanism, by Sunay Tripathi, assigned to the assignee of the present invention, and which is hereby incorporated by reference in its entirety herein.

U.S. patent application Ser. No. 10/683,933 entitled "A System And Method For Vertical Perimeter Protection" by Sunay Tripathi, Bruce Curtis filed Oct. 10, 2003 is incorporated herein by reference.

U.S. patent application Ser. No. 10/683,720, now U.S. Pat. 7,290,055, entitled "Multi-Threaded Accept Mechanism in a Vertical Perimeter Communication Environment" by Sunay Tripathi and E. Nordmark, filed Oct. 10, 2003 is incorporated herein by reference.

U.S. patent application Ser. No. 10/683,959 entitled "Running A Communication Protocol State Machine Through A Packet Classifier" by Sunay Tripathi and Bruce Curtis, filed Oct. 10, 2003 is incorporated herein by reference.

U.S. patent application Ser. No. 10/683,934, now U.S. Pat. 7,313,139, entitled "A Method For Batch Processing Received Message Packets" by Sunay Tripathi and S. Kamatala, filed Oct. 10, 2003 is incorporated herein by reference.

U.S. patent application Ser. No. 10/683,762 entitled "A Method and System For Transmitting Packet Chains" by Sunay Tripathi, Bruce Curtis and C. Masputra, filed Oct. 10, 2003 is incorporated herein by reference.

BACKGROUND

Computer systems typically utilize a software layered approach for implementing communication frameworks where a layer is a program module for processing different portions of data transmitted from a producer to a consumer. The software layered approach requires examination of data by each layer (e.g., a socket layer, a TCP layer, an IP security layer, a firewall layer, an IP layer, etc.) to determine if any work needs to be performed by that layer before sending the data to the next layer. This check is done through all layers. This examination process requires computer instructions and data to be read and processed by the central processing unit(s) (CPU), consuming CPU cycles and therefore time. In many cases, even if a given layer or "module" is not enabled for the data channel, the data packet of the channel will still be examined by the module to determine if processing by that module is needed. Thus, a strictly layered approach to a communication framework processes data packets through stacked layers even if some of the layers have no actions to take with regards to the data packet.

SUMMARY

In an embodiment of the present invention, a first communication packet of a new connection (e.g., a "channel"), is assigned to a communication data structure that is unique to the new connection which includes the first communication packet. An event list is selected from a database based on a classification of the first communication packet. The event list identifies a plurality of software communication modules and an ordering thereof, specific for the new connection. The first communication packet is then processed through the plurality of communication modules based upon the ordering specified in the event list. All other data packets for the new channel are similarly processed through the event list. The data structure also includes a reference, which indicates for a data packet, its current location in the modules of the event list as the data packet is being processed. By determining which modules are required for the connection only once (e.g., at the start of the new connection), each data packet processed within the set-up connection avoids the overhead checking associated with modules that are required for the connection.

For example, when a communication connection is established, a classifier determines the particular administrative policies that govern communication processing for the new connection. For example, a local area network connection may require fewer communication protocols to process a communication packet than an Internet connection requires. Based upon these policies, the classifier selects a send event list (if the channel has outgoing packets) and a receive event list (if the channel has incoming packets) from a plurality of event lists stored in a database, in one embodiment.

An exemplary send event list identifies a plurality of communication modules required for processing an outgoing communication packet and an ordering of those communication modules and is selected based upon the administrative policies defined for the connection that contains the packet. An exemplary receive event list identifies a plurality of communication modules required for processing an incoming communication packet and an ordering of those communication modules and is likewise selected based on the administrative policies defined for the connection that contains the packet. Therefore, the classifier selects the send event list and the receive event list for a connection at the time the connection is set-up based upon the administrative policies applicable to that particular connection. In one embodiment, the classifier places a pointer to the first communication module of each event list in a data structure that is unique to each communication connection.

Packet processing through subsequent communication modules of that connection is processed using the appropriate event list as indicated in the data structure for that connection and the data structure contains a reference of the position that a packet is in during processing through the event list. For example, assuming a connection has already been established (e.g., a unique data structure has already been constructed for the connection), and assuming a data packet is encountered, the classifier determines the connection by examining the local/remote IP addresses and the local/remote port numbers of the computers that are communicating. Using this information, the classifier finds the data structure for that connection and finds the pointer to the appropriate event list for sending or receiving the communication packet. The communication packet is then processed using the communication modules of the event list. The current reference pointer of the data structure tracks the progression of the data packet through the event list.

As a result, determining which communication modules are needed to process a communication packet is advantageously performed once when the connection is established. Subsequent communication packets for that connection are processed by accessing the event list indicated by the data structure for that connection. This prevents redundant checks on each packet to determine what communication processing needs to be performed, thus facilitating communications processing.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 3A is a block diagram of exemplary event lists that can be stored in accordance with embodiments of the present invention.

FIG. 4 shows exemplary connection data structures in accordance with embodiments of the present invention.

FIG. 6 is a flow chart of a computer implemented method for processing communication packets in accordance with embodiments of the present invention.

FIG. 7 is a flow chart of a computer implemented method of processing communication packets within a communication framework in accordance with embodiments of the present invention.

DETAILED DESCRIPTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of embodiments of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "selecting," "identifying," "processing," "classifying," "accessing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
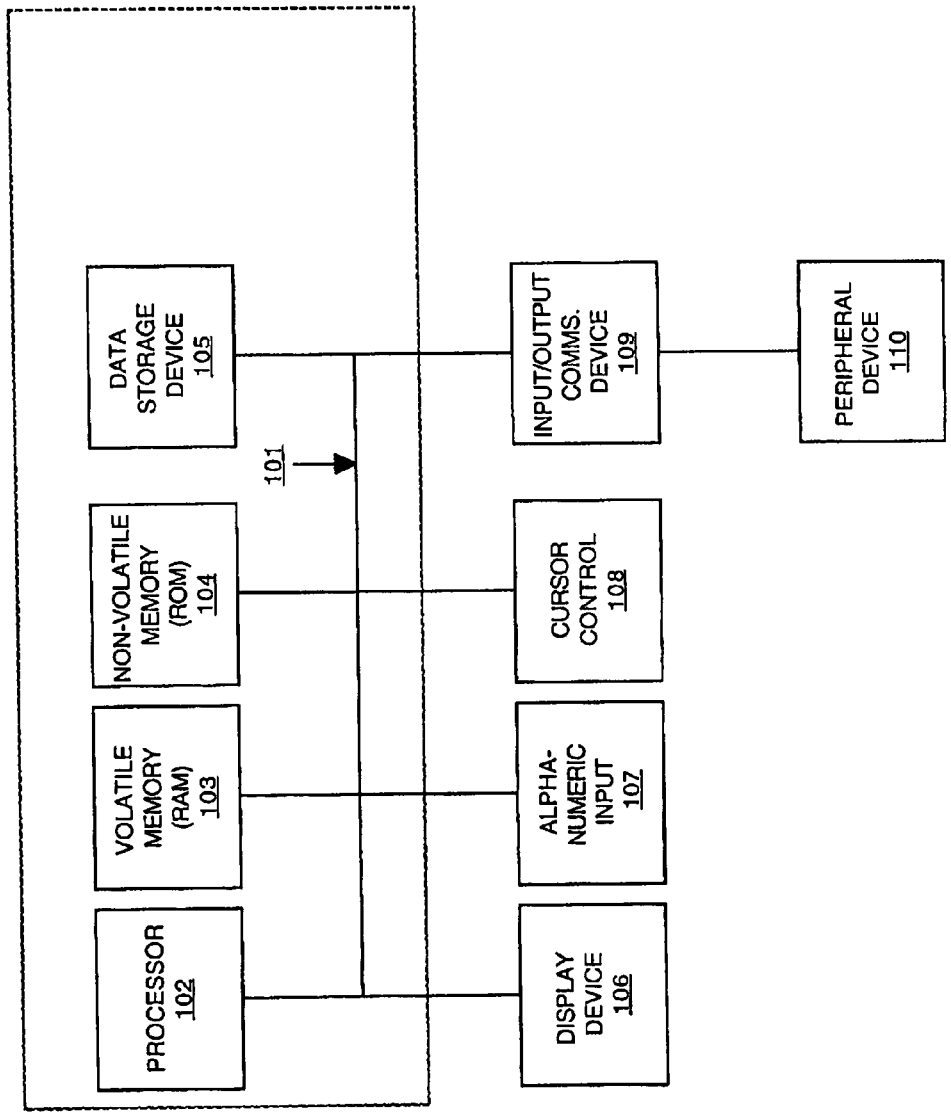
FIG. 1 is a block diagram of an exemplary computer system upon which embodiments of the present invention can be implemented.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including a server system, a general-purpose computer system, embedded computer systems, laptop computer systems, hand-held computer systems, and stand-alone computer systems, etc.

In the present embodiment, computer system 100 includes an address/data bus 101 for conveying digital information between the various components, a processor 102 for processing the digital information and instructions, a volatile memory 103 comprised of random access memory (RAM) for storing the digital information and instructions, and a non-volatile memory 104 comprised of read only memory (ROM) for storing information and instructions of a more permanent nature. In addition, computer system 100 may also include a data storage device 105 (e.g., a magnetic, optical, floppy, or tape drive or the like) for storing vast amounts of data. It should be noted that the software program for processing message packets of the present invention can be stored either in volatile memory 103, data storage device 105, or in an external storage device (not shown).

Devices which are optionally coupled to computer system 100 include a display device 106 for displaying information to a computer user, an alpha-numeric input 107 (e.g., a keyboard), and a cursor control 108 (e.g., mouse, trackball, light pen, etc.) for inputting data, selections, updates, etc. Computer system 100 can also include a mechanism for emitting an audible signal (not shown).

Furthermore, computer system 100 can include an input/output (I/O) communications device 109 for interfacing with a peripheral device 110 (e.g., a computer network, modem, mass storage device, etc.). Device 109 may be a network interface card or NIC device. Accordingly, computer system 100 may be coupled in a network, such as a client/server environment, whereby a number of clients (e.g., personal computers, workstations, portable computers, minicomputers, terminals, etc.) are used to run processes for performing desired tasks. In particular, computer system 100 can be coupled in a system for processing communication packets.

Figure 2:
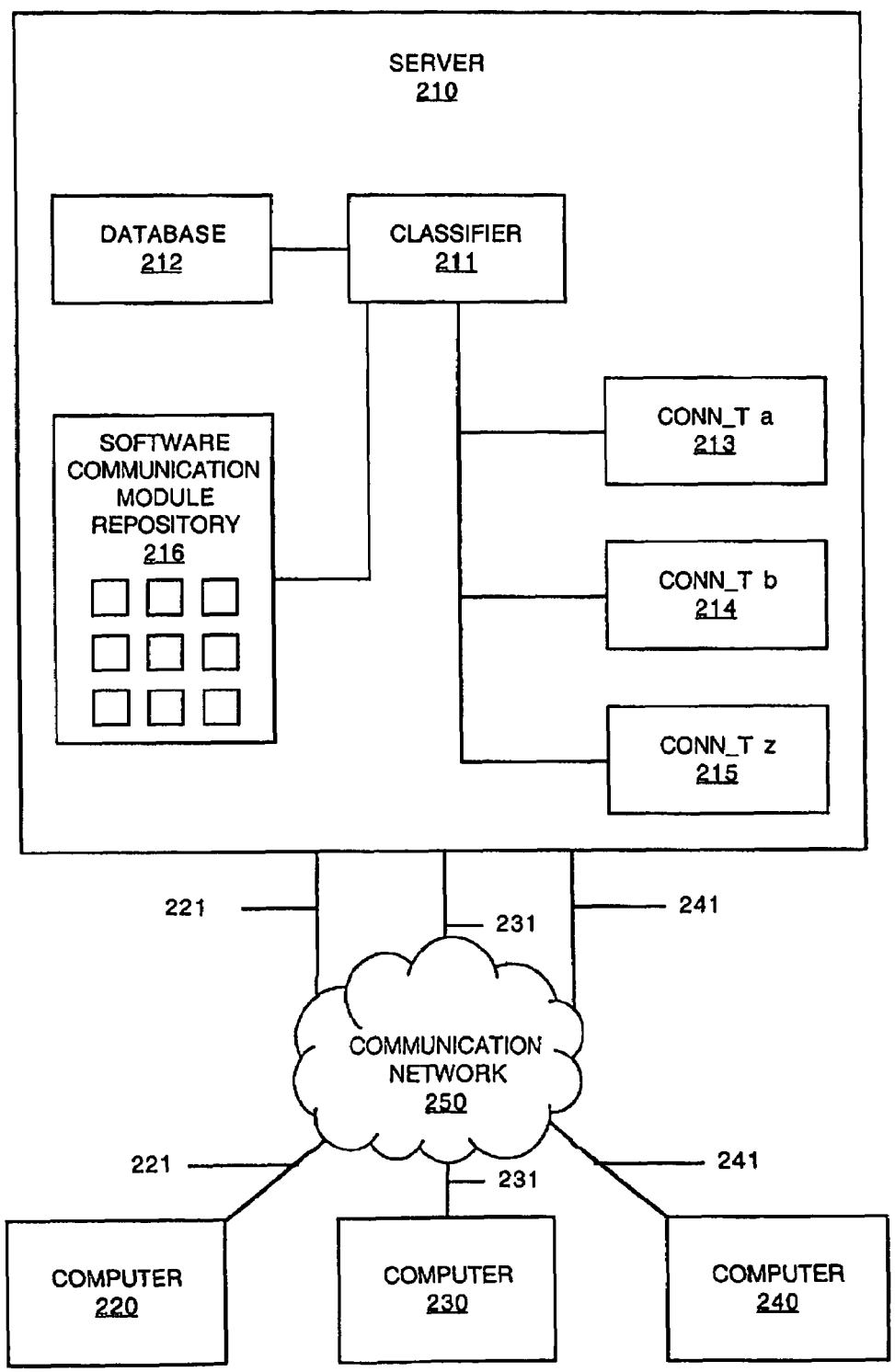
FIG. 2 is a block diagram of an exemplary communications network 200 upon which embodiments of the present invention may be implemented.

FIG. 2 is a block diagram of an exemplary communications network 200 upon which embodiments of the present invention may be implemented. In FIG. 2, a server 210 is communicatively coupled with clients 220, 230 and 240 via communications network 250. In the embodiment of FIG. 2, each client communicates with server 210 using a unique, identifiable connection. For example, connection 221 couples client 220 with server 210 but does not couple either client 230 or client 240 with server 210. Similarly, client 230 communicates with server 210 via a unique connection 231, and client 240 communicates with server 210 via connection 241.

It is noted that communications network 250 can be implemented in a wide variety of ways in accordance with the present embodiment. For example, communications network 250 can be implemented as, but is not limited to, a local area network (LAN), a metropolitan area network (MAN), a wide area network (WAN) and/or the Internet. Additionally, server 210 and clients 220, 230 and 240 can each be communicatively coupled to communications network 250 via wired and/or wireless communication technologies.

In embodiments of the present invention, each connection between server 210 and a client with which it is communicating may be identified using the local IP address and local port number of server 210 along with the remote IP address and remote port number of that client. For example, connection 221 is identified by server 210 using its local IP address and the local port number that the connection is using. Additionally, connection 221 is identified by server 210 using the remote IP address of client 220 and the remote port number of client 220 that the connection is using. Similarly, connection 231 is identified by the local IP address and port number of server 210 that the connection is using, and the remote IP address and port number of client 230 that the connection is using. This classification of the connections may be performed by a classifier 211 of server 210.

Within FIG. 2, also operable on server 210 are a plurality of connection data structures (e.g., conn_t a 213, conn_t b 214, and conn_t z 215). These data structures are created when a connection is initially established between server 210 and another client for traffic in either direction. In embodiments of the present invention, a data structure comprising data used in processing communications (e.g., state information for the connection, pointers to other structures and functions, read and write queues, addresses and port numbers, data packet sequence numbers, etc.) is uniquely assigned to one connection only. For example, conn_t a 213 is a data structure uniquely describing the connection 221 between server 210 and client 220. Similarly, data structure conn_t b 214 can include data that uniquely describes the connection 231 between server 210 and client 230 while conn_t z 215 can include data that uniquely describes the connection 241 between server 210 and client 240. Generally, many individual data packets are associated with each connection.

When a new connection is established between server 210 and another client (e.g., 220), classifier 211 assigns the connection to its own unique data structure (e.g., conn_t a 213). For example, the subsequent communication packets sent or received between server 210 and client 220 via connection 221 are interrogated to determine their connection and are processed using the information in the data structure of conn_t a 213. It is appreciated that more than one connection can exist between a particular client (e.g., 220) and server 210. In embodiments of the present invention, each of those connections receives its own unique data structure describing that particular connection.

Also shown in FIG. 2 is a database 212 that can be accessed by classifier 211. In embodiments of the present invention, database 212 includes a plurality of initial event lists. Each event list identifies a plurality of software communication modules that are used to process the incoming and outgoing communication packets. Once assigned to an event list, the data packet will be processed by the modules identified by the event list by calling each function in the event list. In embodiments of the present invention, an initial send event list and an initial receive event list are selected by classifier 211 based upon the type of connection being established between server 210 and another client (e.g., 220) depending upon whether an inbound and/or outbound connection is established. Pointers to those event lists are then placed in a conn_t (e.g., conn_t a 213) for the connection (e.g., 221) and are used when processing communication packets for that connection. It is appreciated that, in embodiments of the present invention, database 212 can reside on server 210, on another computer (not shown) and/or on storage that is communicatively coupled with server 210.

Also operable on server 210 is a software communication modules repository 216. In embodiments of the present invention, these communication modules 216 are stored as a library of communication modules for processing communication packets and performing communication protocol functionalities. It is appreciated that repository 216 may be resident upon server 210, upon another computer (not shown) and/or upon storage communicatively coupled with server 210. Some examples of software communication modules that may be utilized in embodiments of the present invention include, but are not limited to, a sockets file system module, a Transport Control Protocol (TCP) module, an IP module, a firewall module, an IP security module (e.g., an encryption/decryption module), a Network Computing Architecture™ (NCA) module, a Carrier Grade Transport Protocol (CGTP) module, an IP multipath module, a clustering module, a Quality of Service (QOS) module, etc. In embodiments of the present invention, these modules are accessed via a function stored in the event list used to process a communication packet.

FIG. 3A is a block diagram of exemplary event lists that can be stored in database 212 (FIG. 2) in accordance with embodiments of the present invention. Generally, each event list of the database is different from the others. Event lists 310, 320 and 330 identify a plurality of communication modules that can be used for processing outgoing communication packets from server 310 and provide an ordering of those communication modules. For example, send event list 310 comprises a sockets file system module_A 311, a transmission control protocol (TCP) module_A 312, an Internet Protocol (IP) module_A 313, an IP security module_A 314, and a firewall module_A 315. Send event list 320 comprises a sockets file system module_B 321, a TCP module_B 322, an IP module_B 323, and an IP security module_B 324. Send event list 330 comprises a sockets file system module_C 331, a TCP module_C 332, and an IP module_C 333. It is appreciated that in embodiments of the present invention, each of the sockets file system modules 311, 321 and 331 perform similar processing functionalities. Similarly, each of the TCP modules 312, 322 and 332 perform similar processing functionalities, each of the IP security modules 314 and 324 perform similar processing functionalities, etc.

Event lists 340, 350, and 360 identify a plurality of communication modules that can be used for processing incoming communication packets to server 310 and provide an ordering of those communication modules. For example, receive event list 340 includes a firewall module_D 341, an IP security module_D 342, an IP module_D 343, a TCP module_D 344 and a sockets file system module_D 345. Receive event list 350 includes an IP security module_E 351, an IP module_E 352, a TCP module_E 353, and a sockets file system module_E 354. Receive event list 360 includes an IP module_Z 361, a TCP module_Z 362, and a sockets file system module_Z 363. As described above, each of the similarly named modules provide similar processing functionalities. It is appreciated that embodiments of the present invention are not limited to these communication processing modules alone and may also perform other communication processing protocols such as NCA, CGTP, IP multipath, clustering, QOS, etc.

Figure 3B:
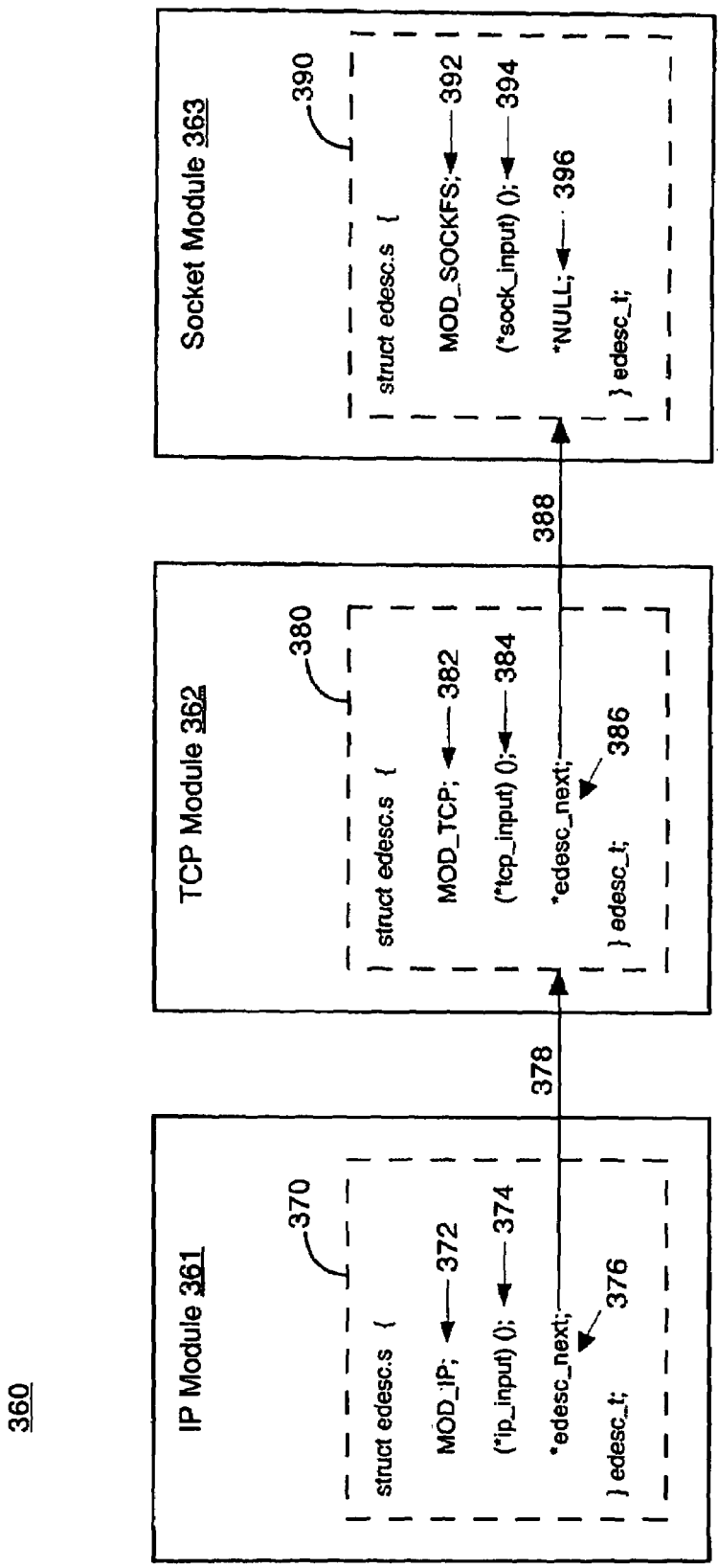
FIG. 3B is a block diagram of an exemplary event list that identifies a sequence of modules that can be used to process an incoming communication packet in accordance with an embodiment of the present invention.

FIG. 3B is a block diagram of an exemplary event list (e.g., receive event list 360 of FIG. 3A) that identifies a sequence of modules that can be used to process an incoming communication packet in accordance with an embodiment of the present invention. Specifically, event list 360 includes an IP module 361, followed by a TCP module 362, that is followed by a socket module 363. It is noted that modules 361, 362 and 363 can be accessed from repository 216 of FIG. 2 as processing of event list 360 is performed.

The IP module 361, TCP module 362, and socket module 363 of FIG. 3B include event descriptors 370, 380 and 390, respectively, that make up event list 360. Within the present embodiment, the event descriptors 370, 380 and 390 each includes a data structure represented by exemplary pseudo code. This code is exemplary only and a variety of syntaxes could be used that accomplish the functionality of embodiments of the present invention. The IP module 361 includes an event descriptor 370 that includes an identifier unique to it shown as "MOD_IP;" at line 372, a function call shown as "(*ip_input) ();" at line 374 that will be called by IP module 370, and a pointer shown as "*edesc_next;" at line 376 that points to the next event descriptor in the event list 360 as shown by arrow 378. Additionally, the TCP module 362 includes an event descriptor 380 that includes an identifier unique to it shown as "MOD_TCP;" at line 382, a function call shown as "(*tcp_input) ();" at line 384 that will be called by TCP module 362, and a pointer shown as "*edesc_next;" at line 386 that points to the next event descriptor in the event list 360 as shown by arrow 388. Furthermore, the socket module 363 includes an event descriptor 390 that includes an identifier unique to it shown as "MOD_SOCKFS;" at line 392, a function call shown as "(*sock_input) ();" at line 394 that will be called by socket module 363, and a pointer shown as "*NULL;" at line 396 that is inactive since the event descriptor 390 is the last event descriptor of event list 360.

During processing of an incoming communication packet utilizing event list 360, the event descriptor 370 of the IP module 361 identifies that IP processing of the communication packet is required. As such, the function at line 374 of the event descriptor 370 is called to perform the IP processing of the communication packet. The pointer at line 376 indicates that the event descriptor 380 of the TCP module 362 is next in the event list 360. Therefore, the function at line 384 of the event descriptor 380 is called to perform the TCP processing of the communication packet. The pointer at line 386 indicates that the event descriptor 390 of the socket module 363 is next in the event list 360. As such, the function at line 394 of the event descriptor 390 is called to perform the socket processing of the communication packet. In this manner, a communication packet is processed utilizing event list 360.

Additionally, in embodiments of the present invention, each processing module can manipulate its own function call based upon what processing needs to be performed. If the lookup of the event list and manipulation of the function call is protected by the vertical perimeter, there is no danger of pitfalls due to simultaneous modification and access in a multithreaded and multiprocessor environment. For example, while a TCP module (e.g., TCP module_Z 362 of FIG. 3A) is executing, it can change its function pointer by changing what function is listed in the "void (*edesc_func) ();" line of the above pseudo code. In this way, a module can alter its entry point from data packet to data packet within the same connection. For example, when a connection is first established, the function called by TCP module_Z 362 may be tcp_input (e.g., the TCP module entry point is "tcp_input"). After the connection is established, TCP module_Z 362 can change the function pointer to tcp_data_input for subsequent packets. This is advantageous because a typical TCP communication module has a complex operational state machine. For example, a connection may go through 8 or 9 TCP operational states in the course of its existence. Conventionally, the TCP module has to determine what state the connection is in before invoking and performing the function call appropriate for that state. In embodiments of the present invention, since the TCP module can manipulate what function call is listed from packet to packet, it can move directly to performing the appropriate function without the discovery process. In other words, the TCP module can select an optimum entry point for the next data packet. It is noted that each module associated with the event list can write and/or manipulate its own portion of the event list.

In embodiments of the present invention, classifier 211 (FIG. 2) selects a send event list and/or a receive event list when a connection is established. Selection of a particular event list is based upon administrative policies governing communications processing of the type associated with the connection. For instance, a different set of communications modules may be required for communication packets arriving from the Internet than for communication packets arriving from a LAN. For example, within FIG. 2, connection 221 with client 220 may be an Internet connection and necessitate the implementation of additional security protocols on server 210. Conversely, connection 231 with client 230 may be a LAN connection and thus not require IP security and firewall protocols. In conventional communication processing, a communication packet may be examined by communication modules that are not needed for that particular connection. This results in redundant checks and overhead by each of the communication modules to determine whether a particular module is needed to perform communications processing. This overhead processing is virtually eliminated by the embodiments of the present invention.

In embodiments of the present invention, classifier 211 of FIG. 2 selects the send and/or receive event lists from event lists stored on database 212. These event lists are used as templates which are then referenced using the pointer (or reference) in the conn_t data structure. As a result, there is no need to create a new event list for each connection being established as multiple connection can share the same list. This is advantageous over conventional processing in that a particular event list can be selected for a connection that only performs the processing necessitated by that connection. For example, some communication packets may only require IP, TCP, and sockets file system processing. In that instance, classifier 211 places pointers to send event list 330 and receive event list 360 in the conn_t data structure for that connection. In another connection, the communication packets may require firewall, IP security, IP, TCP, and sockets file system processing. As such, classifier 211 would place pointers to send event list 310 and receive event list 340 in the conn_t data structure for that connection. In other words, the checks for determining which modules are required for communication processing are only performed once when the connection is being established.

As a result, redundant checks are not necessitated when processing communication packets individually. Because the event lists are already created and reside in database 212 of FIG. 2, the only work being done is determining which event list should be used for a connection being established. When, for example, an incoming communications packet arrives at server 210, classifier 211 determines whether there is an existing connection. If there is not, classifier 211 examines the local and remote IP address and the local and remote port number of the connection. Using this information, classifier 211 determines the administrative policies governing this type of connection and places pointers to the appropriate event lists in the conn_t data structure for that connection. When a subsequent connection arrives for the same connection, classifier 211 determines what connection is being processed, by examining the local/remote IP address and port numbers, selects the appropriate conn_t data structure for that connection, and uses the receive event list for that connection. Outgoing communication packets for a connection are processed in a similar manner.

FIG. 4 shows exemplary memory resident connection data structures in accordance with embodiments of the present invention. In FIG. 4, conn_t a 213 comprises a data entity conn_recv 410, followed by pointer 411 (also called a "reference pointer") which points to the first communication module of the receive event list (e.g., firewall module_D 341 of FIG. 3A) that is used when processing communication packets for the connection conn_t a 213 uniquely describes (e.g., connection 221). Conn_t a 213 also comprises a data entity conn_recv_current 420, followed by pointer 421 which indicates what communication module in the receive event list is currently performing processing of a communication packet. Conn_t a 213 also comprises a data entity conn_send 430, followed by pointer 431 which points to the first communication module of the send event list (e.g., socket module_A 311 of FIG. 3A) that is used when processing communication packets for the connection conn_t a 213 uniquely describes (e.g., connection 221). Conn_t a 213 also comprises a data entity conn_send_current 440, followed by pointer 441 which indicates what communication module (e.g., socket module_A 311) in the send event list is currently performing processing of a communication packet.

In FIG. 4, conn_t b 214 comprises a data entity conn_recv 450, followed by pointer 451 which points to the first communication module of the receive event list (e.g., IP module_Z 361 of Figure) that is used when processing communication packets for the connection conn_t b 214 uniquely describes (e.g., connection 231). Conn_t b 214 also comprises a data entity conn_recv_current 460, followed by pointer 461 (also called a "reference pointer") which indicates what communication module in the receive event list is currently performing processing of a communication packet (e.g., TCP module_Z 362 of FIG. 3A). In the embodiment of FIG. 4, server 210 can be currently performing TCP processing of a communication packet received via connection 231. Conn_t b 214 also comprises a data entity conn_send 470, followed by pointer 471 which points to the first communication module of the send event list (e.g., socket module_C 331 of FIG. 3A) that is used when processing communication packets for the connection conn_t b 214 uniquely describes (e.g., connection 231). Conn_t b 214 also comprises a data entity conn_send_current 480, followed by pointer 481 which indicates what communication module in the send event list is currently performing processing of the communication packet.

Within FIG. 4, it is noted that conn_t a 213 and conn_t b 214 may utilize different receive event lists (e.g., 340 and 360, respectively) and thus may utilize different pointers to their respective event lists (e.g., pointers 411 and 451, respectively). Additionally, conn_t a 213 and conn_t b 214 may utilize different send event lists (e.g., event lists 310 and 330, respectively) and thus may utilize different pointers to their respective send event lists (e.g., pointers 431 and 471, respectively). As described above with reference to FIG. 4, classifier 211 selects the event lists appropriate to a connection, as determined by the administrative policies governing communications processing.

In embodiments of the present invention, if an administrative policy is changed (IP security is enabled), classifier 211 places a pointer to the appropriate event lists (e.g., send event list 320 and receive event list 350) in the conn_t data structure for connections being established. Thus, the new administrative policy can be enabled without having to perform custom coding for the new communication module. As a result, changing administrative policy can be performed by embodiments of the present invention without the necessity of re-booting the server.

Figure 5A:
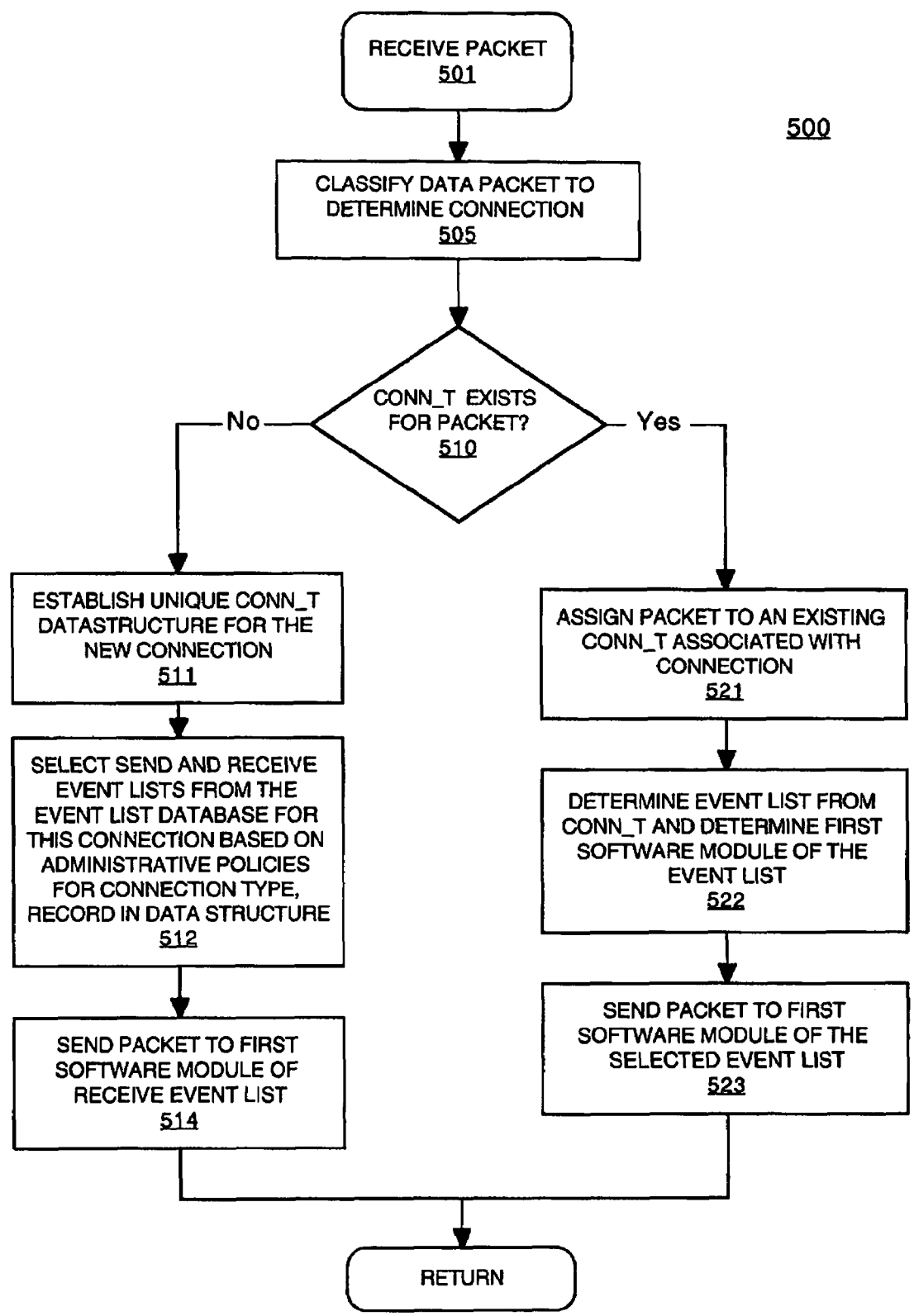
FIG. 5A is a flow chart of a computer implemented method of processing for a new data packet encountered (e.g., sent or received) in accordance with embodiments of the present invention.

FIG. 5A is a flowchart 500 of operations performed in accordance with an embodiment of the present invention for processing communication packets. Flowchart 500 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 500, such operations are exemplary. That is, the present embodiment is well suited to performing various other operations or variations of the operations recited in FIG. 5A. It is noted that the operations of flowchart 500 can be performed by software, by firmware, by hardware or by any combination thereof. Additionally, it is appreciated that the operations described in flowchart 500 describe processing performed upon a received data packet. However, it is appreciated that embodiments of the present invention can be performed upon send data packets as well.

In operation 501 of FIG. 5A, a communication packet is received by a device. For the purposes of the following discussion, it can be assumed that the data packet is received by server 210 from a client (e.g., 230 of FIG. 2). However, method 500 may also be used to process outgoing communication packets sent, for example, from server 210 to a client (e.g., 230).

In operation 505, the data packet is classified to determine the connection to which the data packet belongs. In operation 505, the communications packet is classified to determine the connection. In embodiments of the present invention, classifier 211 of FIG. 2 can determine the connection based upon the local/remote IP addresses and the local/remote port numbers of the computers in the connection. In the present embodiment, classifier 211 can determine, based upon this information, that the communications packet belongs to connection 231 between client 230 and server 210.

In operation 510, a logical operation is performed to determine whether a conn_t data structure exists for the received communication packet. In one embodiment, the local/remote IP address of the computers in the communications connection, as well as the local/remote port numbers of the computers, are used to determine whether a conn_t data structure exists for the connection (e.g., 231 of FIG. 2). If a conn_t data structure exists for this connection, the present embodiment proceeds to operation 520. If a conn_t data structure does not exist for this connection, the present embodiment proceeds to operation 511.

In operation 511 of FIG. 5A, a unique conn_t data structure is created for the new connection. In embodiments of the present invention, a unique conn_t data structure (e.g., conn_t b 214 of FIG. 4) is created for each communication connection when the connection is established. If a conn_t data structure does not already exist (as determined in operation 510), it is created for this connection.

In operation 512, an event list is selected for this connection from the event list database based upon administrative policies for this connection type and the event list is recorded in the data structure. In one embodiment, upon determining the connection type, classifier 211 of FIG. 2 determines the administrative policies that apply to the connection. For example, if the connection is via the Internet, the administrative policies may mandate a higher level of security processing (e.g., a firewall module, and an IP security module) than for a connection via a LAN. Classifier 211 can select an event list that identifies the communication modules used to implement the administrative policies applicable to that connection. In one embodiment, a database (e.g., 212 of FIG. 2) lists a plurality of event lists that can be used to perform communications processing of the received communication packet. The event lists (e.g., send event list 330 and receive event list 360 of FIG. 3A) are selected for that particular connection and are recorded in the conn_t data structure for that connection.

In operation 514, the communications packet is sent to the first software module in the receive event list. In the present embodiment, upon creating data structure conn_t b 214, conn_recv pointer 451 is read, and the packet is sent to IP module_Z 361 for communications processing. Alternatively, if a communications packet is being sent from server 210 to client 230, conn_send pointer 471 is read, and the packet is sent to socket module_C 331 for processing.

If, at operation 510 of FIG. 5A, it is determined that a conn_t data structure exists for the communications connection, the present embodiment proceeds to operation 521. In operation 521, the communications packet is assigned to an existing conn_t data structure associated with the connection. In the present embodiment, classifier 211 of FIG. 2 can determine that conn_t b 214 is the data structure uniquely assigned to connection 231 and the communications packet is assigned to conn_t b 214.

In operation 522 of FIG. 5A, an appropriate event list is determined from the conn_t and the first software module of the event list is determined. In the present embodiment, since the communications packet is being received by server 210, it will be processed by receive event list 360. The pointer (e.g., 451 of FIG. 4) to the first software module (e.g., IP module_Z 361 of FIG. 3A) in the event list is read.

In operation 523, the communications packet is sent to the first software module in the selected event list. In the present embodiment, based upon the pointer to IP module_Z 361, as indicated by conn_recv pointer 451, the communications packet is then processed by IP module_Z 361.

Figure 5B:
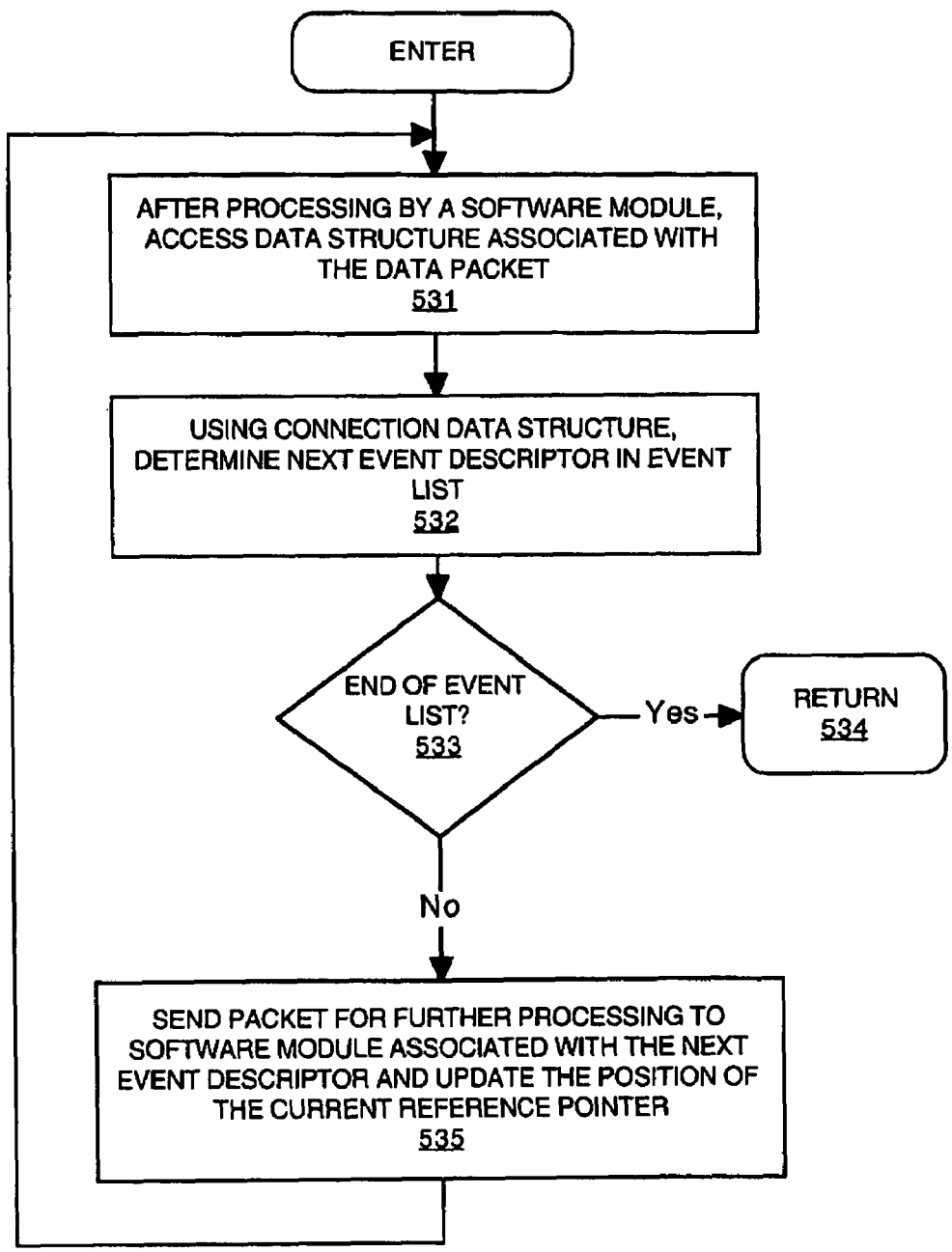
FIG. 5B is a flow chart of a computer implemented method of processing a data packet through an event list in accordance with embodiments of the present invention.

FIG. 5B is a flowchart 530 of operations performed in accordance with an embodiment of the present invention for processing a data packet through an event list. Flowchart 530 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 530, such operations are exemplary. That is, the present embodiment is well suited to performing various other operations or variations of the operations recited in FIG. 5B. It is noted that the operations of flowchart 530 can be performed by software, by firmware, by hardware or by any combination thereof.

In operation 531 of FIG. 5B, after processing by a software module, a data structure associated with the communications module is accessed. Continuing with the example described herein with reference to FIG. 5A, after a communications packet has been processed by IP module_Z 361, data structure conn_t b 214 is accessed to continue processing the communications packet.

In operation 532, using the communication data structure (e.g., conn_t b 214), the next event descriptor is determined in the event list. For example, the reference pointer to the next event descriptor is determined in the event list (e.g., using conn_recv_current pointer 461 of FIG. 4). In embodiments of the present invention, a pointer to the currently processing communications module is also resident in conn_t b 214. A module sets this pointer to its own event descriptor at the start of the processing. Upon completion of the processing by the communication module (e.g., IP module_Z 361), the conn_recv_current pointer (e.g., 461) is referenced again to determine the current event descriptor and the next module (e.g. TCP module_Z 362 of FIG. 3A) is determined from the next pointer.

In operation 533 of FIG. 5B, a logical operation is performed to determine whether the currently processing software module is the last in the event list. If the last module in the event list has performed its processing, the present embodiment returns to a wait state in operation 534.

If the event list has not completed processing of the communications packet, the present embodiment proceeds to operation 535 of FIG. 5B, wherein the packet is sent to the next module associated with the next event descriptor and the position of the current reference pointer in the data structure is updated. For example, after IP processing of the packet has been completed by IP module_Z 361, the packet is then processed by TCP module_Z 362 of FIG. 3A. While the function invoked by TCP module_Z 362 is processing the communications packet, the conn_recv_current pointer 361 of data structure conn_t b 214 is updated to indicate that TCP module_Z 362 is now currently processing the data packet. Upon completion of TCP processing using TCP module_Z 362, the present embodiment proceeds to operation 531 again.

FIG. 6 is a flow chart of a method 600 for processing communication packets in accordance with embodiments of the present invention. In step 610, a first communication packet is assigned to a first communication data structure which is unique to a first connection that comprises said first communication packet. In embodiments of the present invention, whenever a communication connection is established, classifier 211 assigns a unique data structure (e.g., conn_t a 213, conn_t b 214, and conn_t z 215 of FIG. 2) to each connection describing, for example, state information for the connection, pointers to other structures and functions, read and write queues, addresses and port numbers, data packet sequence numbers, etc. The first packet arriving for that connection is thus assigned to the first data structure (e.g., conn_t b 214 of FIG. 4). It is appreciated that the first communication packet can be a send communication packet from server 210 or a receive communication packet sent to server 210.

In step 620 of FIG. 6, a first event list is selected from a database based upon a classification of the first communication packet. In embodiments of the present invention, classifier 211 selects a send event list and a receive event list (e.g., send event list 330 and receive event list 360 of FIG. 3) from database 212 based upon the connection type and the administrative policies governing communication processing that apply to that connection type.

In embodiments of the present invention, classifier 211 determines which event lists to assign to a connection based upon the administrative policies governing communication processing as enforced at, for example, server 210. In embodiments of the present invention, classifier 211 determines the local/remote IP addresses and the local/remote port numbers of the computers that are connected (e.g., server 210 and computer 230 of FIG. 2) to determine which administrative policies are applicable to a particular connection. As a result, classifier 211 determines which communication processing protocols are required to process a communication packet for that connection and selects the appropriate event lists to implement those processing protocols. In embodiments of the present invention, each send event list and each receive event list identifies a plurality of communication processing modules and an ordering of those modules for processing a communication packet.

In step 630 of FIG. 6, the first communication packet is processed through the first plurality of communication modules based on the ordering of the first event list. In embodiments of the present invention, classifier 211 accesses a pointer to the first communication module of the first event list (e.g., pointer 361 of FIG. 4) in the data structure (e.g., conn_t b 214 of FIG. 4) to determine the first function to invoke to process the communication packet.

In embodiments of the present invention, the data structure (e.g., conn_t b 214 of FIG. 2) comprises a pointer to the first communication module of the event list (e.g., pointer 361 of FIG. 4) and second pointer to the currently processing communication module (e.g., pointer 362 of FIG. 4). The processing of the communication packet is performed using the communication modules in the event list in the order designated by the event list. Because the classifier has determined which communication modules are necessary for processing the communication packet, none of the modules in the event list are required to perform checks to determine whether that module has to perform processing of the packet. Instead, in embodiments of the present invention, each communication module simply invokes the function call specified in the data structure of the module. As a result, redundant checks to determine which modules are enabled are eliminated in embodiments of the present invention.

Additionally, each module can modify its own function call based upon the state of the communication connection in embodiments of the present invention. For example, the TCP module (e.g., TCP module 362 of FIG. 3) can change the function depending upon the state of the connection. As a result, redundant checks to determine the state of the connection are eliminated in embodiments of the present invention.

As an example, when a second communication packet for the first connection arrives at server 210, classifier 211 determines the connection by examining the local/remote IP addresses and the local/remote port numbers of the computers in the connection. This allows determining the particular connection to which the second communication packet belongs. Classifier 211 then accesses the data structure for that connection (e.g., conn_t b 214 of FIG. 4) to determine which event list to access to process the second communication packet. The second communication packet is then processed by invoking the function of the first communication module in that event list (e.g., IP module 361 of FIG. 3).

When a third communication packet arrives at server 210 from a second connection, classifier 211 determines what administrative policies governing communication processing apply to the second connection. Classifier 211 then selects a send event list and a receive event (e.g., send event list 310 and receive event list 340 of FIG. 3) list from database 212 and places pointers to the first communication modules of those event lists in a data structure unique to the second connection (e.g., conn_t a 213 of FIG. 4).

When a fourth communication packet arrives at server 210 from the second connection, classifier 211 determines the connection by examining the local/remote IP addresses and the local/remote port numbers of the computers in the connection. This allows determining the particular connection (e.g., the second connection) to which the fourth communication packet belongs. Classifier 211 then accesses the data structure for that connection (e.g., conn_t a 213 of FIG. 4) to determine which event list to access to process the fourth communication packet. The fourth communication packet is then processed by invoking the function of the first communication module in that event list (e.g., IP module 341 of FIG. 3).

FIG. 7 is a flow chart of a method 700 of processing communication packets within a communication framework comprising a first plurality of modules in accordance with embodiments of the present invention. In step 710 of FIG. 7, a first communication packet is assigned to a first communication data structure which is unique to a first connection that comprises the first communication packet within a communication framework comprising a first plurality of modules. As described above, when a first communication packet for a first connection is sent or received by server 210, classifier 211 assigns a first data structure (e.g., conn_t b 214 of FIG. 4) to that first connection comprising the first communication packet. The first communication packet is assigned to the first data structure to facilitate communication processing in embodiments of the present invention. In embodiments of the present invention, the communication framework comprises a first plurality of modules (e.g., IP module 341, firewall module 342, IP security module 343, TCP module 344, and socket module 345 of FIG. 3) that are resident in, for example, repository 216 of server 210.

In step 720 of FIG. 7, a first event list is selected from a library of lists, the first event list identifying a second plurality of modules that is a subset of the first plurality of modules from a database based upon a classification of the first communication packet. In embodiments of the present invention, classifier 211 selects a send event list and a receive event list based upon administrative policies governing communication processing that are applicable to that particular connection. For example, a first event list (e.g., event list 360 of FIG. 3) is selected from a library of lists (e.g., database 212). In embodiments of the present invention, the first event list (e.g., event list 360) identifies a second plurality of modules (e.g., IP module 361, TCP module 362, and socket module 363 of FIG. 3) that is a subset of the plurality of the software communication modules (e.g., modules 341, 342, 343, 344, and 345 of FIG. 3) resident in repository 216. Event list 360 is selected from database 212 by classifier 211 based upon classification of the connection type and the administrative policies implemented at server 210 governing that type of connection and a pointer to the first module (e.g., IP module 361 of FIG. 3) is placed in the data structure for that connection (e.g., pointer 361 of FIG. 4).

In step 730 of FIG. 7, the first communication packet is processed through the second plurality of modules based on the ordering of the second event list. The first communication packet is processed using the function call listed in the data structure of IP module 361. After IP module 361 has finished processing the communication packet, TCP module 362 begins processing the communication packet and updates the conn_send_current data entity by changing the pointer for that entity with the pointer to TCP module 362. TCP module 362 processes the communication packet using the function call listed in the data structure of TCP module 362. After TCP module 362 has finished processing the communication packet, socket module 363 begins processing the communication packet and updates the conn_send_current data entity by changing the pointer for that entity with the pointer to socket module 363. As described above, subsequent communication packets are processed using the event lists indicated in the conn_t data structure for that connection.

The preferred embodiment of the present invention, a method and system for processing communication packets using event lists, is thus described. While the present invention has been described in particular embodiments, it should be appreciated that the present invention should not be construed as limited by such embodiments, but rather construed according to the following claims.

What is claimed is:

1. A computer-implemented method of processing communication packets stored in memory, the processing comprising:
    assigning a first communication packet to a first communication data structure which is unique to a first connection that comprises said first communication packet, wherein said first communication data structure comprises a first pointer to a first communication module of a first event list and a second pointer which points to a currently processed communication module during processing of said first event list;
    selecting said first event list from a database, said first event list selected based on a classification of said first communication packet, said first event list identifying a first plurality of communication modules specific for said first connection and an ordering thereof; and
    processing said first communication packet through said first plurality of communication modules based on said ordering.

2. A method as described in claim 1 further comprising classifying said first communication packet to determine which communication modules are required for processing thereof, said classifying performed before said selecting.

3. A method as described in claim 1 wherein said first communication packet is an initial communication packet of a plurality of communication packets of said first connection.

4. A method as described in claim 3 further comprising:
    accessing a second communication packet of said first connection;
    accessing said first communication data structure to identify said first event list associated with said first connection;
    processing said second communication packet through said plurality of communication modules based on said ordering.

5. A method as described in claim 4 wherein said communication modules comprise function call interfaces.

6. A method as described in claim 4 wherein said communication packets are send communication packets.

7. A method as described in claim 4 wherein said communication packets are receive communication packets.

8. A computer-implemented method of processing communication packets stored in memory, the processing comprising:
    assigning a first communication packet to a first communication data structure which is unique to a first connection that comprises said first communication packet;
    selecting a first event list from a database, said first event list selected based on a classification of said first communication packet, said first event list identifying a first plurality of communication modules specific for said first connection and an ordering thereof;
    processing said first communication packet through said first plurality of communication modules based on said ordering;
    assigning a third communication packet to a second communication data structure that is unique to a second connection that comprises said third communication packet;
    selecting a second event list from said database, said second event list selected based on a classification of said third communication packet, said second event list identifying a second plurality of communication modules specific for said second connection and an ordering thereof, wherein said first plurality of communication modules is different from said second plurality of communication modules; and
    processing said third communication packet through said second plurality of communication modules based on said ordering of said second event list.

9. A method as described in claim 8, wherein said third communication packet is an initial communication packet of a plurality of communication packets of said second connection.

10. A method as described in claim 9, further comprising:
    accessing a fourth communication packet associated with said second connection;
    accessing said second communication data structure to identify said second event list associated with said second connection;
    processing said fourth communication packet through said second plurality of communication modules based on said ordering of said second event list.

11. A method as described in claim 8, wherein said second data structure comprises a first pointer to the first communication module of said second event list and a second pointer which points to the currently processed communication module during said processing of said second event list.

12. A method as described in claim 8 further comprising classifying said third communication packet to determine which communication modules are required for processing thereof, said classifying of said third communication packet performed before said selecting of said second event list.

13. A method as described in claim 8 wherein said communication modules comprise function call interfaces.

14. A computer-implemented method of processing communication packets stored in memory within a communication framework comprising a first plurality of modules, the processing comprising:
    assigning a first communication packet to a first communication data structure which is unique to a first connection that comprises said first communication packet, wherein said first data structure comprises a first pointer to the first module of a first event list and a second pointer which points to a currently processed module during said processing of said first event list;

selecting a first event list from a database, said first event list selected based on a classification of said first communication packet, said first event list identifying a second plurality of modules specific for said first connection and an ordering thereof, wherein said second plurality is a subset of said first plurality; and processing said first communication packet through said second plurality of modules based on said ordering.

15. A method as described in claim 14 further comprising classifying said first communication packet to determine which modules are required for processing thereof, said classifying performed before said selecting.

16. A method as described in claim 14 wherein said first communication packet is an initial communication packet of a plurality of communication packets of said first connection and further comprising:

accessing a second communication packet of said first connection;

accessing said first communication data structure to identify said first event list associated with said first connection; and processing said second communication packet through said plurality of communication modules based on said ordering.

17. A computer-implemented method of processing communication packets stored in memory within a communication framework comprising a first plurality of modules, the processing comprising:

assigning a first communication packet to a first communication data structure which is unique to a first connection that comprises said first communication packet;

selecting a first event list from a database, said event list selected based on a classification of said first communication packet, said first event list identifying a second plurality of modules specific for said first connection and an ordering thereof, wherein said second plurality is a subset of said first plurality;

processing said first communication packet through said second plurality of modules based on said ordering;

assigning a third communication packet to a second communication data structure that is unique to a second connection that comprises said third communication packet;

selecting a second event list from said database, said second event list selected based on a classification of said third communication packet, said second event list identifying a third plurality of communication modules specific for said second connection and an ordering thereof, wherein said third plurality is a subset of said first plurality and wherein further said second plurality is different from said third plurality of communication modules; and processing said third communication packet through said third plurality of communication modules based on said ordering of said second event list.

18. A method as described in claim 17 wherein said third communication packet is an initial communication packet of a plurality of communication packets of said second communication and further comprising:

accessing a fourth communication packet associated with said second connection;

accessing said second communication data structure to identify said second event list associated with said second connection;

processing said fourth communication packet through said third plurality of communication modules based on said ordering of said second event list.

19. A method as described in claim 17, wherein said second data structure comprises a first pointer to the first communication module of said second event list and a second pointer which points to the currently processed communication module during said processing of said second event list.

20. A method as described in claim 17 further comprising classifying said third communication packet to determine which modules are required for processing thereof, said classifying of said third communication packet performed before said selecting of said second event list.

* * * * *